Dec. 25, 1951 J. DEANE 2,580,076
COMPOSITION FOR MAKING ACOUSTIC MATERIAL
Filed April 29, 1948
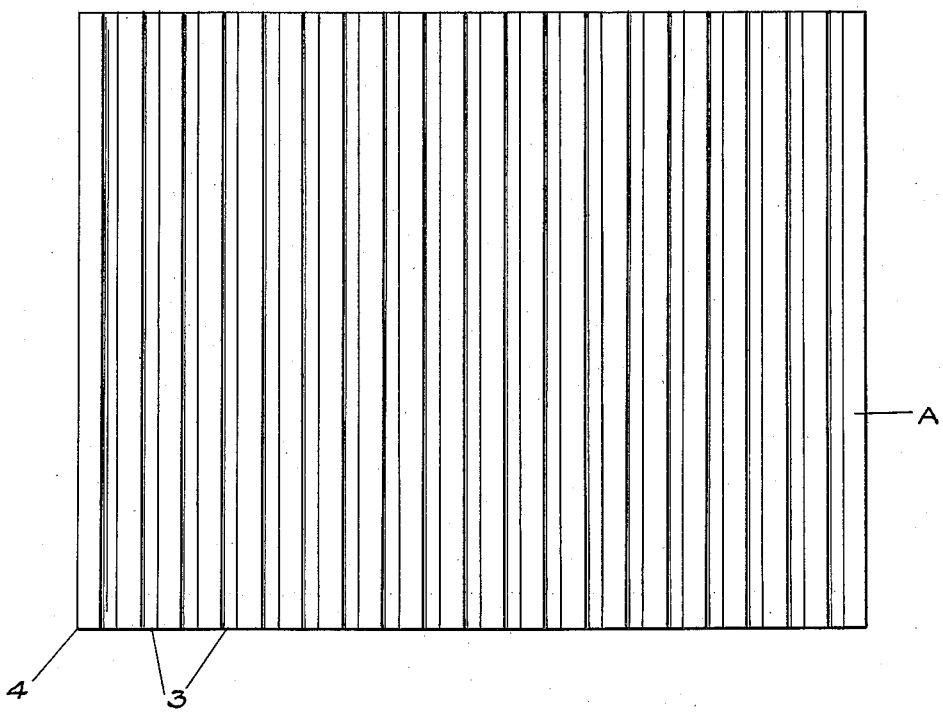
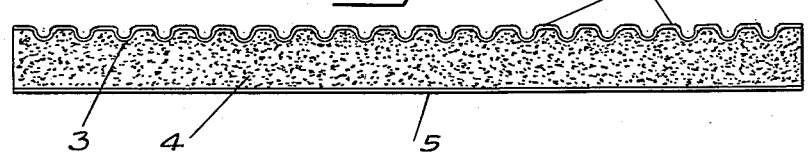
INVENTOR.
JOHN DEANE
BY
Edward C Healy
ATTORNEY Patented Dec. 25, 1951

2,580,076

UNITED STATES PATENT OFFICE 2,580,076

COMPOSITION FOR MAKING ACOUSTIC MATERIAL

John Deane, San Francisco, Calif., assignor of forty per cent to Sarah Lucas, San Francisco, Calif.

Application April 29, 1948, Serial No. 23,889

1 Claim. (Cl. 260—746)

This invention relates to a new and useful improvement in acoustic materials and has particular reference to a composition that possesses a high co-efficient of sound absorption and great tensile strength and which may be cast, rolled, or otherwise formed for use as an acoustic plaster, acoustic tile, wall or plaster board, or as a covering for walls and ceilings.

The principal object of the invention is the utilization of a product for the purposes recited, wherein conventional jute and paper are entirely eliminated, thus reducing to a considerable extent the cost of manufacturing plaster board and the like.

An additional object of the invention resides in the treatment of the composition by subjecting the same, by spraying or a like method, to a back and front surface coating of latex that serves as a protective film and a bond that adds considerable strength to the product to prevent breaking of the same, and wherein a high degree of porosity is realized for acoustical purposes.

A further object of the invention is the production of an acoustic material which, when rendered plastic, will possess the characteristics of setting or hardening.

A further object of the invention is the production of an acoustic material that is economical to manufacture, strong, durable, light in weight, and highly serviceable in use.

Other objects and advantages will be apparent during the course of the following description.

In the accompanying drawing I have illustrated in Fig. 1, a plan view of a section of plaster board which is produced by the ingredients of the present composition, and in Fig. 2 an end elevation of the same.

The bulk or body of the mass will be formed of any desired combination of the hereinafter recited ingredients. For example, in making the acoustic tile the ingredients employed are preferably:

(1) Perlite, ground pumice or "Syra Foam,"
(2) Sodium paraphosphate,
(3) Corn starch, or bicarbonate of soda,
(4) Cream cf tartar,
(5) Asbestos or powdered fibre,
(6) Bentonite or fuller's earth,
(7) Copper sulfate, and
(8) Liquid latex.

The number one ingredient gives body to the composition.

The sodium paraphosphate, the corn starch or bicarbonate or soda have suspension characteristics. The cream of tartar, the asbestos or powdered fibre gives body to the composition and each acts as a binding agent. The bentonite possesses adhesive characteristics and also functions to suspend the product and likewise gives plasticity whereby the material can be easily worked or spread. The copper sulfate serves as a disinfectant and renders the composition deadly to termites and other forms of insect life. The latex acts as a binding agent, as will be hereinafter fully explained.

In making acoustic plaster, wall or plaster board, or for the use of the composition as a covering for walls and ceilings, I preferably use the following ingredients:

(A) Perlite, ground pumice, or "Spray Foam,"
(B) Gypsum in any form or Portland cement,
(C) Aluminium sulphate,
(D) Latex.

In this instance the gypsum or Portland cement gives body to the composition and acts as a binding agent, and the aluminium sulphate, when mixed with water, causes a chemical reaction that liberates small bubbles or carbonic acid gas which aerates the mixture and thereby renders the plaster porous. This porosity makes the product lighter and stronger, and also a lesser conductor of heat than a non-porous plaster.

In preparing my composition for use as an acoustic tile the ingredients recited for this particular product are thoroughly commingled and are used in approximately the following proportions:

| | Parts |
|---|---|
| (1) Perlite, ground pumice or "Spray Foam" | 50 |
| (2) Sodium paraphosphate | 5 |
| (3) Amidex, corn starch, or bicarbonate of soda | 10 |
| (4) Cream of tartar | 5 |
| (5) Asbestos or powdered fibre | 3 |
| (6) Bentonite or fuller's earth | 3 |
| (7) Copper sulfate | 4 |
| (8) Liquid latex | 20 |

When plaster board is the product, the ingredients recited are used in approximately the following proportions:

| | Parts |
|---|---|
| (A) Perlite, ground pumice, or "Spray Foam" | 30 |
| (B) Gypsum in any form or Portland cement | 30 |
| (C) Aluminium sulphate | 10 |
| (D) Latex | 30 |

After pouring to size on a cellophane coat on a bench or in a cellophane coated retort, the composition will assume, in a predetermined time, a semi-plastic state. The upper exposed surface will be subjected to treatment by a serrated implement to form the grooves 3, as indicated in the drawing. After drying a binding agent, such as latex, is applied to the exposed surface and it will flow thereover to provide an uneven key and a definite holding medium or bond "A" that gives to the board considerable strength and greater porosity for the recited acoustical purpose.

In Fig. 2 of the drawing the numeral 4 indicates the body of the composition, while the numeral 5 designates the cellophane coating for the base of the board 4.

While I have specified the preferred ingredients used in my composition it is to be understood that certain changes relative to the materials employed and the proportions of the same may be readily resorted to without departing from the spirit of the invention or the scope of the subjoined claim.

Having thus described my invention, I claim:

The herein described composition of matter for making acoustic tile comprising ground pumice 50 parts, sodium paraphosphate 5 parts, corn starch 10 parts, cream of tartar 5 parts, asbestos 3 parts, bentonite 3 parts, copper sulfate 4 parts, and liquid latex 20 parts.

JOHN DEANE.

REFERENCES CITED

The following references are of record in the file of this patent:

UNITED STATES PATENTS

| Number | Name | Date |
|---|---|---|
| 1,598,505 | Ramsden | Aug. 31, 1926 |
| 1,765,748 | Teague | June 24, 1930 |
| 1,976,946 | Kliefoth | Jan. 20, 1933 |
| 1,977,874 | Denning | Oct. 23, 1934 |
| 2,001,916 | Mazer | May 21, 1935 |

FOREIGN PATENTS

| Number | Country | Date |
|---|---|---|
| 191,474 | Great Britain | Jan. 12, 1923 |